US009230033B2

(12) United States Patent
Yahyaoui et al.

(10) Patent No.: US 9,230,033 B2
(45) Date of Patent: Jan. 5, 2016

(54) LOCATION BASED CLEARINGHOUSE SEARCH

(75) Inventors: Wajih Yahyaoui, Bellevue, WA (US); Warren Vincent Barkley, Preston, WA (US); Kapil Nath Sharma, Woodinville, WA (US); Joseph Arthur Williams, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 13/225,563

(22) Filed: Sep. 6, 2011

(65) Prior Publication Data

US 2013/0060743 A1 Mar. 7, 2013

(51) Int. Cl.
*G06F 17/30* (2006.01)
*G06Q 30/02* (2012.01)

(52) U.S. Cl.
CPC ...... *G06F 17/3087* (2013.01); *G06F 17/30864* (2013.01); *G06Q 30/0241* (2013.01)

(58) Field of Classification Search
CPC ............... G06F 17/30486; G06Q 30/0241
See application file for complete search history.

(56) References Cited

U.S. PATENT DOCUMENTS

| 6,798,358 | B2 | 9/2004 | Joyce et al. | |
|---|---|---|---|---|
| 7,424,472 | B2 | 9/2008 | Wang et al. | |
| 7,603,360 | B2 * | 10/2009 | Ramer et al. | |
| 7,721,328 | B2 * | 5/2010 | Boulos et al. | 726/6 |
| 7,859,402 | B2 | 12/2010 | Miller et al. | |
| 8,005,822 | B2 | 8/2011 | Rechis et al. | |
| 2008/0168033 | A1 * | 7/2008 | Ott et al. | 707/3 |
| 2011/0289106 | A1 * | 11/2011 | Rankin et al. | 707/769 |

FOREIGN PATENT DOCUMENTS

| CN | 102129453 | 7/2011 |
|---|---|---|
| CN | 102169503 A | 8/2011 |

OTHER PUBLICATIONS

Sun, et al., "SLUP: A Semantic-Based and Location-Aware Unstructured P2P Network", Retrieved at <<http://ieeexplore.ieee.org/stamp/stamp.jsp?tp=&arnumber=4637710>>, 10th IEEE International Conference on High Performance Computing and Communications, Sep. 25-27, 2008, pp. 288-295.

(Continued)

*Primary Examiner* — Hosain Alam
*Assistant Examiner* — Tuan-Khanh Phan
(74) *Attorney, Agent, or Firm* — Jim Ross; Micky Minhas

(57) ABSTRACT

Concepts and technologies are described herein for processing queries from a user's computing device initiating a query. In one embodiment, responding to the query involves searching for results based on the user's location and a list of federated enterprises. A clearinghouse server receives the query and determine a location of the user by accessing a location information database. The clearinghouse server then uses the location information in formulating a query to a search engine, by including location information with the user's query. The results are then processed in light of the list of federated enterprises. The processing may include ordering the search results, filtering the search results, or allowing enhanced forms of communications between the user and a selected party associated with the federated enterprise. The results are provided to the user. The enhanced forms of communication include instant messaging and video conferencing.

20 Claims, 5 Drawing Sheets

(56) References Cited

OTHER PUBLICATIONS

Chen, et al., "LoSeCo: Location-based Search Computing for Pervasive Device Augmentation", Retrieved at http://ieeexplore.ieee.org/stamp/stamp.jsp?tp=&arnumber=4912830>>, Seventh Annual IEEE International Conference on Pervasive Computing and Communications—Workshops, Mar. 9-13, 2009, pp. 6.

Franti, et al., "Location-Based Search Engine for Multimedia Phones", Retrieved at <<http://ieeexplore.ieee.org/stamp/stamp.jsp?tp=&arnumber=5583538>>, IEEE International Conference on Multimedia and Expo, Jul. 19-23, 2010, pp. 558-563.

"Overview of Live Search for Devices", Retrieved at http://msdn.microsoft.com/en-us/library/cc510681.aspx>>, Oct. 16, 2008, pp. 4.

Office Action dated Jan. 19, 2015 in Chinese patent application No. 201210325692.8 filed Sep. 5, 2012.

The Chinese Office Action mailed Jul. 8, 2015 for Chinese patent application No. 201210325692.8, a counterpart foreign application of U.S. Appl. No. 13/225,563, 6 pages.

* cited by examiner

LOCATION BASED CLEARINGHOUSE SEARCH

BACKGROUND

Many forms of communications now use the Internet as a backbone network. This allows a more comprehensive set of control capabilities to be offered to users for different forms of communication, such as voice, video conferencing, email, instant messaging, and other forms. This rich set of control capabilities is facilitated by using graphical user interfaces on communication devices that allow easy selection of control options by the user, and allow detailed information to be provided in response to a user's search requests.

These communication devices, often in the form of smartphones or computers, often offer tools to aid in storing, organizing, and searching contact information. These tools are useful for organizing the user's personal contacts, which can include contact information for various forms of communication with a person. For organizing enterprise-wide information, enterprise based tools may be used to organize contact information. Typically, users do not desire to popular their entire business enterprises' contact list into their smartphone. Enterprise-wide tools can be used, for example, to identify a colleague in the same enterprise based on job function and can provide enterprise contact information to the user (e.g., telephone number, email address, IM address, etc.).

If the name of the person to be reached ("target" or "target contact") is known beforehand to the user initiating the communication ("user"), the identification of the target's communication information may be as easy as looking up the person's name in the user's smartphone or enterprise based contact search engine. If the target contact is not a work colleague, but a person from another enterprise, then the user's enterprise directory may not be useful in ascertaining the target contact's communication address information.

Thus, it can be difficult to determine the target's contact information if the target's name information is 1) not maintained in the user's smartphone or laptop, and 2) not a work colleague. The user can rely on public directories to ascertain the target contact's published telephone number, but many times even the telephone number information is not generally available. Further, public directories frequently do not contain the target's email address, IM address, or address forms. It is even more complicated if the name of the target is not known, and the user only desires to speak to a person with a particular job function, skill set, or location in a different enterprise (e.g., customer service manager for a retail store in a certain location).

In many instances, identifying the appropriate target individual is implicitly based on the user's location. For example, initiating a request to identify a customer service manager for a particular retail store may be predicated on the particular retail store based near the user's location. In many other instances, the appropriate target contact is implicitly associated with an enterprise that has a business relationship with the user's employer (i.e., the "user's enterprise").

Thus, providing information to a user's search request for establishing communications with a target contact depends in part on the user's location and previously established business relationships. It is with respect to these and other considerations that the disclosure made herein is presented.

SUMMARY

Concepts and technologies are described herein for processing a user's search query based on using information associated with the user's location and modifying the search results using information about federated enterprises before providing the modified search results to the user. A federated enterprise is a business that has agreed to provide enhanced communication capabilities with the user's enterprise.

In one embodiment, a computing device processes a search query from a requesting computing device. The computing device includes a memory, network interface unit, and a processor. The memory is configured to store federated enterprise data. The federated enterprise data includes data associated with a first enterprise that is associated with a user identifier. The memory is also configured to store data of a second enterprise, where the second enterprise is associated with the first enterprise. The computing device also includes a network interface unit that is configured to receive a first query from the requesting computing device. The processor is further configured to initiate a second query to a location information server wherein the second query includes the user identifier. The processor then receives location information with the user identifier from the location information server. The processor is further configured to initiate a third query to a search engine where the third query is based on the first query. The processor is further configured to receive a first search query response from the search engine, create a second search query response based on the first search query response and the federated data, and transmit the second search query response to the user.

In another embodiment, a method of processing in a server is provided. The method includes the operation of receiving a query at the server from a computing device, wherein the query includes originating address information of the computing device and a user identifier. The server then initiates a second query to a location information server wherein the second query includes the originating address information of the computing device. The server receives the location information from the location information server, and generates a third query to a search engine that includes the location information and at least a portion of the query from the computing device. The server receives a response to the third query from the search engine including a plurality of search results. The method further includes using the user identifier to ascertain an enterprise associated with the computing device's by using the user identifier. The server then processes the plurality of search results using the at least one federated enterprise to produce a modified plurality of search results, and transmits the modified plurality of search results to the computing device.

In another embodiment, a computer-readable storage medium is provided having computer-readable instructions stored thereupon which, when executed by a computer, cause the computer to receive a query at the computer that includes an originating address information of a computing device and a user identifier. The instructions when further executed causes the processor to initiate a second query to a location information server wherein the second query includes the originating address information of the computing device. The computer receives the location information from the location information server and generates a third query at the computer including the location information to a search engine, wherein the third query includes at least a portion of the query from the computing device. The computer receives a response to the third query from the search engine comprising a plurality of search results. Finally, the computer identifies at least one federated enterprise affiliated with an enterprise associated with the user, and processes the plurality of search results using the at least one federated enterprise to produce a modified plurality of search results. The computer then transmits the modified plurality of search results to the computing device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
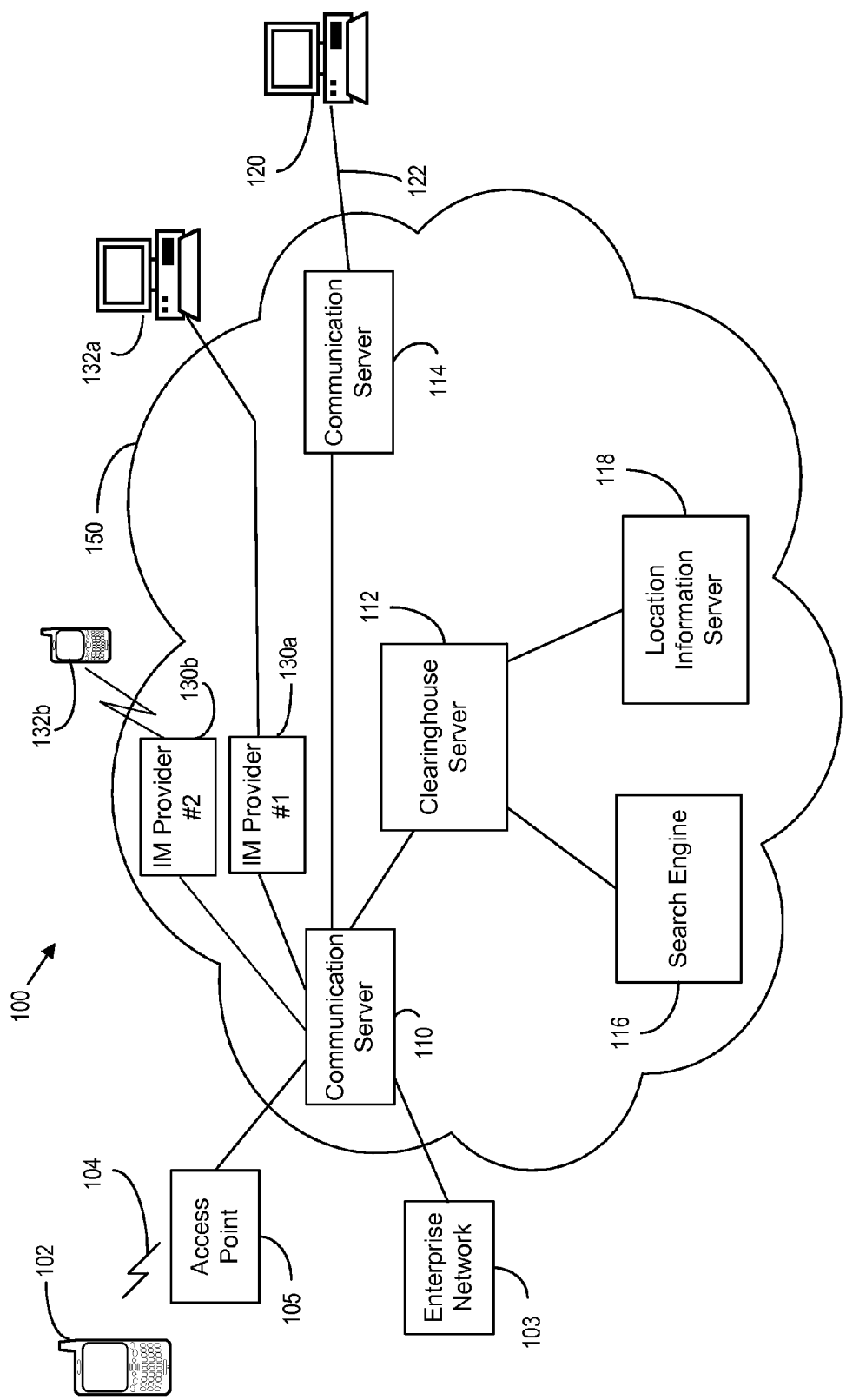
FIG. 1 is an architectural overview diagram including clearinghouse server according to one of the various embodiments disclosed herein.

The following detailed description is directed to technologies for incorporating a user's location and/or a federated enterprise of the user when processing a query from the user seeking information for effecting communication with a target contact. As used herein, the "user" or "initiator" is a person operating a computer device desiring to initiate communications of with a destination party, referred to herein as the "target" or "target contact." The term "user" is generally synonymous with a computing device operated by the user. Thus, referring to a user initiating a query can be interpreted as a user operating a computing device causing the computing device to initiate the query. The user may be associated with an enterprise ("user's enterprise"), regardless of whether the user owns or is employed by the enterprise. The user may not always know the name or particular person of the intended target contact. This is commonly the case where the user desires to speak with a person associated with a particular job function in an enterprise, but does not know the name that person, or may not even know the name of the enterprise. The form of communication can vary, but it is typically based on one of the well-known current forms of digital communication, such as instant messaging ("IM"), email, video conferencing, or voice communications.

To aid the user identify an appropriate target to establish communications with, various types of directories or search engines are available that can identify a target and their communication information. The communications information may include information used to address an instance of digital communications, including instant message address, telephone number, email address, etc. Many conventional directory services focus on voice (e.g., telephone) service and implicitly focus on address information within a geographical area.

Using a "white pages" or "yellow pages" directory is typically predicated on information for a particular geographical area. Public directories for telephone numbers are relatively easy to locate using various Internet based search tools, but frequently individuals prefer not to publish this information, as many individuals do not desire to readily receive telephone calls from the public at large. In other cases, some enterprises deliberately limit the availability of employee contact information in public directories because it can result in employees receiving distracting communications. For many business enterprises, there is a balance between making such information available to facilitate business-to-business interaction, and unnecessarily allowing uncontrolled, public access to their employees. Oftentimes, enterprises may seek to make contact information available to their customers or suppliers, but not to the general public.

On-line search tools can relatively limited in using an initiator's location or other originating location information to process a search query. The user may have to explicitly indicate a location context in order to receive useful information in response to a search query. For example, searching for a service provider (e.g., dentist, auto mechanic, accountant, etc.) is often predicated in some way on the initiator's location.

Other searches are predicated on the nature of the enterprise. For example, a business owner seeking to contact a trucking company would likely be interested in first contacting those trucking companies that already are servicing the user's business (or have otherwise established some sort of relationship with the small business).

An enterprise that is a large business may incorporate custom tools to aid users in searching, identifying, recommending, and contacting appropriate targets, but a small business entity ("SBE") often may not own and operate this infrastructure. Rather, a SBE may obtain hosted services such as email, instant messaging, voice over IP ("VoIP") services, and Internet Protocol ("IP") based video conferencing from a third-party service provider. Thus, the user is limited to whatever search tools are provided by the service provider to aid in searching, identifying, recommending, and contacting targets.

Once architecture for incorporating location information in selecting and effecting communication with a target contact is the system 100 shown in FIG. 1. In FIG. 1, the user 102 is depicted as using a mobile device comprising a smartphone. Other types of computing devices, such as a tablet, laptop, or desktop computer could be used.

For sake of illustration, the user 102 is presumed to be associated with a small business enterprise and is able to access various communication services using the mobile device, including Internet access, IM, video conferencing, and voice services through an access point 105. The access point 105 may be accessed using, e.g., a wireless transmission standard, such as Wi-Fi or other communication protocol. The access point 105 may be owned and operated by the enterprise, or it may be a public Wi-Fi access point, a so called "hot spot" that allows public users to access the Internet. In other embodiments, the user 102 may obtain access via an enterprise network 103, which may include access points, routers, and/or other types of communication equipment.

Regardless of the type of communication service used, the access point 105 or the enterprise network 103 involved can be associated with a particular location. The granularity of the location is relative and can be as specific as a street address, or as broad as a municipality. When using the access point, the user's location is typically associated with the location of the access point, although the user may be located anywhere within a radius of about 100 meters of the access point (e.g., the typical range of using Wi-Fi). When using an enterprise network, the user's location may be that of the address of a particular building.

The user 102 accesses the communication server 110 to obtain various communication services. In one embodiment, the interface used by the user is based on a session initiated protocol ("SIP") communication protocol. A SIP based communication server 110 can provide control for various types of multi-media communications over a TCP/IP or Internet connection and is a well-known mechanism for providing VoIP, video conferencing, and other forms of packetized communications using Internet infrastructure. While it is possible for larger business entities to own and operate the communication server 110, in this embodiment the communication server 110 is operated by a third-party service provider, hence the communication server 110 is shown as being within a cloud 150, which represents the third party service provider to the user 102.

The communication server 110 may be connected to other communication servers, one of which in FIG. 1 is shown as communication server 114. Using these communications servers 110, 114, the user 102 is able to establish the previously identified types of communication with a target contact 120, shown as using a desktop computer. There is no requirement that the target contact 120 must be associated with the same enterprise as user 104, or located in the same area. In the embodiment shown in FIG. 1, user 102 is associated with one business enterprise and the target contact 120 is associated with another business enterprise.

Although the users are associated with distinct enterprises, these two enterprises are "federated" in this embodiment. When two businesses are federated, or belong to a common federation, there is an increased level of trust and cooperation involving communication between their respective members. Thus, communication services available to members within an enterprise may be extended to federated enterprise members, e.g., members outside of the user's enterprise.

An example can illustrate one such enhanced communication capability. Within a given enterprise, users can signal a "presence" (status information) to other members within the same enterprise. The communication server 110 is able to maintain the presence information and indicate it to other members within the enterprise. At the simplest level, presence can be an indication of whether a target is available or unavailable for receiving communications. For example, a "do not disturb" indication is a rudimentary type of presence indicator. However, a much more robust set of presence indicators is available for members of an enterprise using the communications server 110. For example, various states can be conveyed including: in the office; outside the office; and currently involved in a meeting, conference call, or other activity. The presence indicator can be very specific (e.g., "unavailable this afternoon due to participation in project design meeting") or very broad ("do not disturb"). Different status indicators can be provided for different forms of communications (e.g., a target individual is unavailable for voice calls, but is accepting email.)

While presence indicators are usually available to members within an enterprise, these capabilities can also be extended between members of two enterprises if the two enterprises agree to do so. By establishing a federated relationship, enhanced communication capabilities may be offered between members of two enterprises. Further, the capabilities between the two federated enterprises need not be completely transparent as between the enterprises, but can be limited in various ways. For example, as between two federated enterprises, a restricted set of presence indicators may be allowed, whereas the full set of presence indicators are only allowed within a given enterprise. As between two enterprises that are not federated, an even more restricted set of presence capabilities may be allowed, if at all.

Further, the capabilities offered between members of two federated companies can be defined by department, individual members, or other criteria. For example, the legal department of one enterprise (a business) may be federated with a service provider (e.g., a law firm). The legal department of the business and the law firm may allow an enhanced level of presence to be provided between the two, but the enhanced communication capability may not extend to the other departments in the business. Further, specific individuals may have individually defined, levels of cooperation.

Information regarding the types of enhanced level of communication capabilities that may be used and/or provided between federated enterprises can be stored in the clearinghouse server and accessed as needed. The information includes lists associating an enterprise with its federated partners, as well as further information such as contact information and allowed communication capabilities between the enterprises, etc. Although the type of enhanced level of communication information to be provided is stored in the clearinghouse server, the information itself may be obtained from other sources, such as the communication server 110.

The clearinghouse server 112 is able to also communicate with other services, including a search engine 116 and location information server 118. The search engine can be, in one embodiment, a general Internet information search engine such as the Microsoft® BING™ search engine. In other embodiments, the search engine can be a more specialized search engine, such as geographical map search engine, an employee directory search engine, product information search engine, etc. Although the clearinghouse server 112, search engine 116, and location information server 118 are shown as based in the service provider cloud 150, and therefore operated by a service provider, in other embodiments one or more of these components could be operated by the enterprise or another third party provider.

The clearinghouse server 112 receives queries from the user 102, and determines a location of the user using the location information server 118. The location information server 118 can ascertain the location of the user using various forms of identification. In one embodiment, the originating IP address in the query message is provided to the location information server 118 and used to ascertain a geographical location of the user. The resulting information may be relatively high level, as the location information server 118 may only be able to ascertain the user's location in a general locality, such as a town. In other embodiments, the user may provide identification, such as an originating telephone number, calling name, enterprise name, or other user identification data that can be used to identify a street address of the user's location.

In one embodiment, the location information server 118 can be a server used to provide E911 location services for telecommunications related services. E911 service provides street location information based on a caller's originating telephone number. Servers used for this application could be adapted to function as the location information server 118 and process queries from the clearinghouse server 112.

In one embodiment, after the clearinghouse server 112 receives location information in response to a location request query, the clearinghouse server then launches a query to the search engine 116. In various embodiments, the location information from the location information server 118 may be used by the clearinghouse server 112 in forming the query to the search engine 116. In other embodiments, the clearinghouse server 112 can send a query to the search engine 116 without the location information and process the results using the location information. The processed results can then be returned to the user 102. In either embodiment, the clearinghouse server 112 is able to use the user's location information in some manner to respond to the user's request.

The clearinghouse server 112 may also maintain data about federated enterprises associated with the user, so that the clearinghouse server can also process the search result information using information about other enterprises. For example, the the user 102 initiating the query may be associated with a manufacturer that has negotiated a discounted rate with a specific car rental agency for employee car rental. Thus, the manufacturer may have established a federation between itself and the car rental agency. The user (while on business in a remote city) may desire to establish contact with the federated rental car agency, even though the user cannot remember the particular name of the car rental agency. Thus, a search request from the user 102 for a nearby car rental agency could return the name, map, street address, and contact information of a nearby car rental agency that is federated with the manufacturer.

Because of the federated relationship between the manufacturer and the car rental agency, the opportunity for enhanced communications may be possible. For example, the contact information provided to the user for this search may list different telephone numbers than are generally publicized (e.g., high priority customer service telephone numbers). In other embodiments, the response to the search request could include an instant messaging address, video conferencing information, or other types of access contact information. Thus, the user 102 may be able to instant message, video conference, or conduct other forms of communication that may not be readily available to non-federated members.

The response information could also indicate other information to the user, such as presence information of the target contact, or provide for other telecommunication services which otherwise would not be available between non-federated members. For example, the response to a search request may include icons or thumbnail photos of key target individuals, presence information, and/or links for quickly establishing various forms of communication with them.

The communication server 110 can be also connected to an IM provider 130*a*, 130*b* (collectively referred to as 130). The IM provider 130 can be a third party IM provider, such as those associated with AOL®, Yahoo®, and other service providers. This allows user 102 to communicate with a target contact 132*a* or 132*b* (collectively referred to as 132) via a separate IM provider if required. Also, although not shown, the communication server can be connected to various other communication networks, including conventional public switched telephone networks, cellular networks, the Internet, corporate email networks, etc. Thus, the target individual does not have to be served by the communication server 110, nor the communication server 114.

Figure 2:
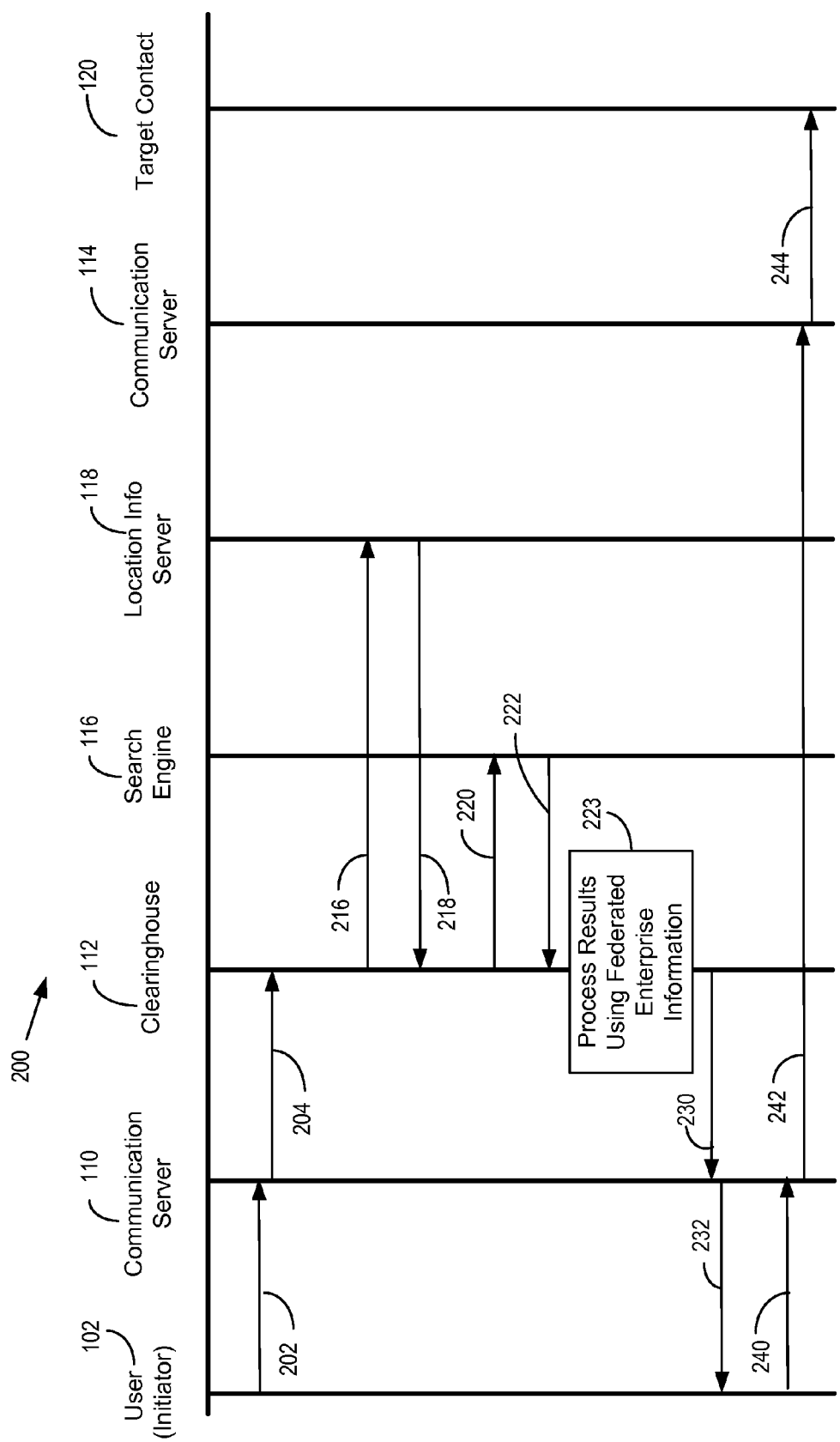
FIG. 2 is a message flow diagram involving the clearinghouse server according to one of the various embodiments disclosed herein.

An exemplary message flow illustrating how the above components are involved in processing a user request is shown in FIG. 2. In FIG. 2, the user 102 launches a request 202 to the communication server 110. The request can be of various forms, including natural language text based queries. For sake of illustration, the query is assumed to involve a request for identifying a target for the purpose of subsequently establishing communication. As indicated in the above example, the query could be for contacting the customer service manager of the nearest car rental agency. This example will also illustrate how the user's location information can be used in fulfilling the query.

The request 202 can be conveyed using a SIP based protocol for managing communications between the user and the communication server. Other protocols, such as HTTP could be used for conveying the search request to the communication server. In one embodiment, the request includes originating user information, which could be a telephone number associated with the user of other forms of identification. The communication server 110, in turn, launches a request 204 to the clearinghouse server 112 that may include the originating user identifier.

If the user does not provide an originating user identifier, such as a telephone number, the originating IP address could be used by the clearinghouse server 112. This IP address could be, e.g., associated with the access point 105 used by the user 102. Depending on the access facility, the IP originating address could correspond to a hot spot, a digital subscriber line ("DSL"), router, gateway, or other telecommunications equipment.

The clearinghouse server 112 provides the originating user identification information in a query 216 to the location information server 118 which is able to provide a geographical location associated with the user. The location could be identified by a GPS type coordinate, a street location, city name, or other location identifier. The location information server 118 then provides the location to the clearinghouse in a response 218. A variety of communication protocols can be used for launching the query and receiving the response. It is not required that a SIP-based protocol be used between the clearinghouse server and the location information server 118.

The clearinghouse server 112 also initiates another query 220 to the search engine 116. This query is illustrated as occurring after the location results are received by the clearinghouse server 112, but in some embodiments the query 220 to the search engine can be initiated before, or contemporaneous with the location query. In one embodiment, the query 220 to the search engine 116 may be based on the user's original query without the inclusion of location information. In another embodiment, the query to the search engine 116 may be augmented by the clearinghouse server with the location information received from the location information server 118.

Once the clearinghouse server 112 has received the query results 222 from the search engine, the clearinghouse may process the search results at operation 223 using the federation information associated with the user 102. The user's enterprise can be determined using the user identification information. Once the user's enterprise is known, this can be used to retrieve a list of federated enterprises. The federation information may be stored in a database in the clearinghouse server, and based on the user's identification, the appropriate originating enterprise can be identified. Once the originating enterprise is identified, then any federated enterprises affiliated with the originating enterprise can also be identified. The clearinghouse server is configured to then process the search results using the federated enterprise information.

The nature of the processing performed using federated enterprise information can vary, and can including filtering, ordering, and augmenting the search results. Filtering the results may screen the search results to only include information associated with federated enterprises. Ordering the search results may include presenting search results associated with federated enterprises at the beginning of the list. Augmenting the search results may involve providing additional information associated with the federated enterprises. For example, additional directory, presence information, or communication related information can be provided to the user for the federated enterprise.

If the augmented information is stored in the communication server, then the clearinghouse server can access this for incorporation into the search results. Specifically, if a search result is associated with a federated enterprise, additional information from the federation database can be retrieved about the federated enterprise and added to the search results. This could include communication related information that can encompass contact information, thumbnails images of particular contacts, status information, etc. If the augmented information is not stored on the clearinghouse server, the clearinghouse server may access another server (such as the communication server 110 or 114) to provide the augmented information.

Once the processing of operation 223 in the clearinghouse server is completed, the results are returned in response 230 to the communication server, which in turn forward the results in response 232 to the user. The user may review the results, and select a particular target contact for establishing communication. If so, then a request for communication 240 is sent by the user to the communication server, which may establish communications 242 with a remote communications server 114, which in turn establishes communication with the target contact 120 via communication 244.

The above concepts can be illustration by returning to the example of the user requesting to contact a nearby car rental agency. There may be two car rental agencies at two locations near the user's location, but only one car rental agency is a federated enterprise. The user may be presented with search results comprising contact information for both federated and non-federated car rental agencies, but the federated car rental agency is presented first and includes presence status or IM contact information for the customer service managers. In other embodiments, an icon (such as a star) can be indicated along with the search result indicating that the result is a federated enterprise. In contrast, the search results for the non-federated car rental agencies may only provide conventional, publicly published contact information in the search results.

Figure 3:
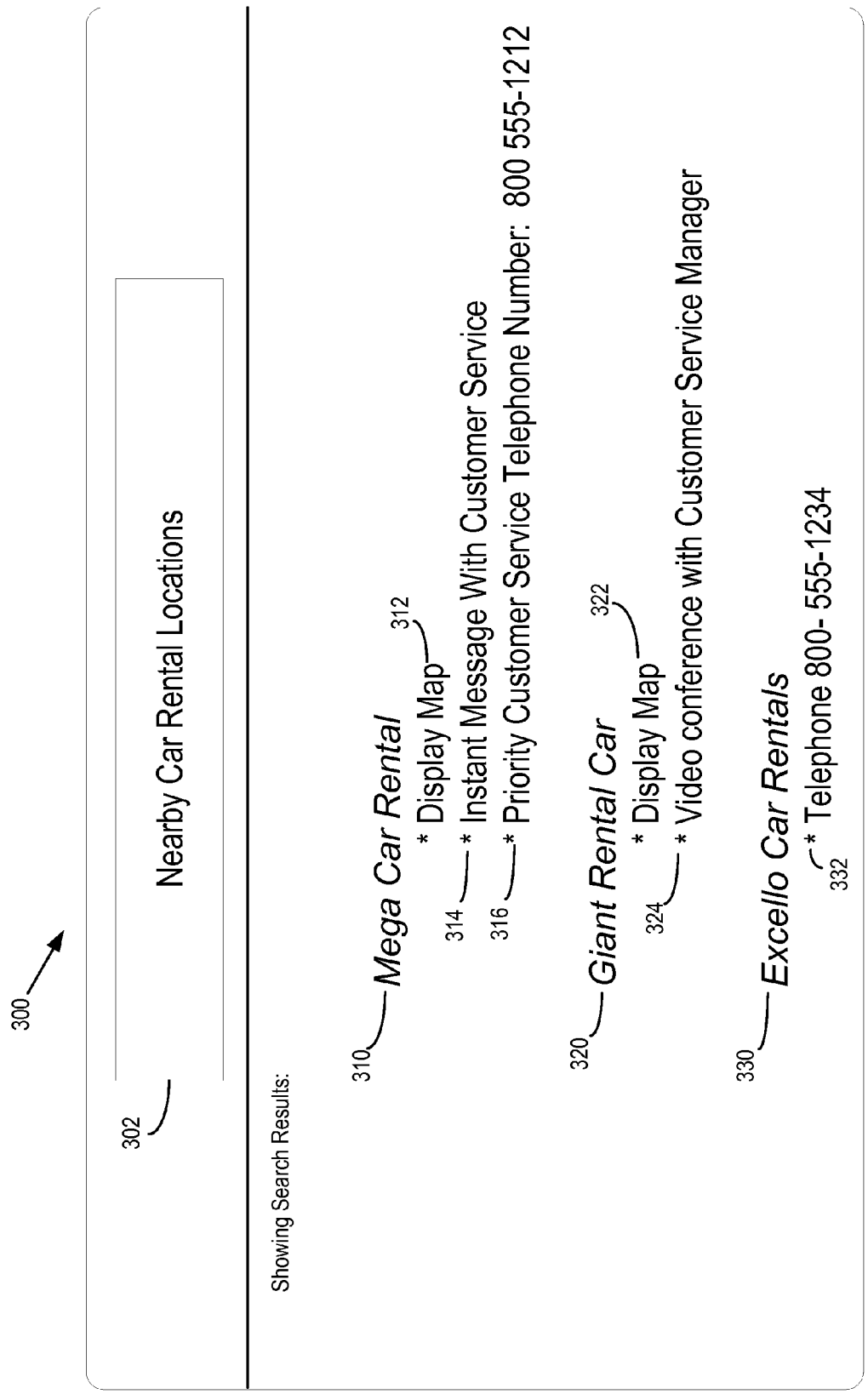
FIG. 3 illustrates a user interface indicating results from the clearinghouse server according to the various embodiments disclosed herein.

One possible user interface for presenting the search results to a user is shown in FIG. 3. In FIG. 3, the display 300 shows the search results for a user's query 302 of "Nearby Car Rental Locations," The search results 310, 320, 330 comprise three enterprise names, the first two of which are federated with the user's enterprise. The first search result 310 provides a map 312 to the destination based on the user's location, as determined by the location information server 118. The first search result 310 also provides two forms of communication with the enterprise, including the ability to instant message 314 with the customer service department, and a priority customer service contact telephone number 316. Either of these forms of communication can be initiated by the user selecting the appropriate selection in the search result.

The second search result 320, which also is federated with the user's enterprise, displays a mapping option 322 and the ability to initiate a video conference 324 with the customer service manager. The third search result 330, which is not a federated enterprise, merely displays a telephone number for the user.

In the above examples, the ordering of the search results may be influenced by the federated status of the results. Further, a database stored in the clearinghouse server may be accessed to provide supplemental information for enhanced communication with the federated enterprise.

Figure 4:
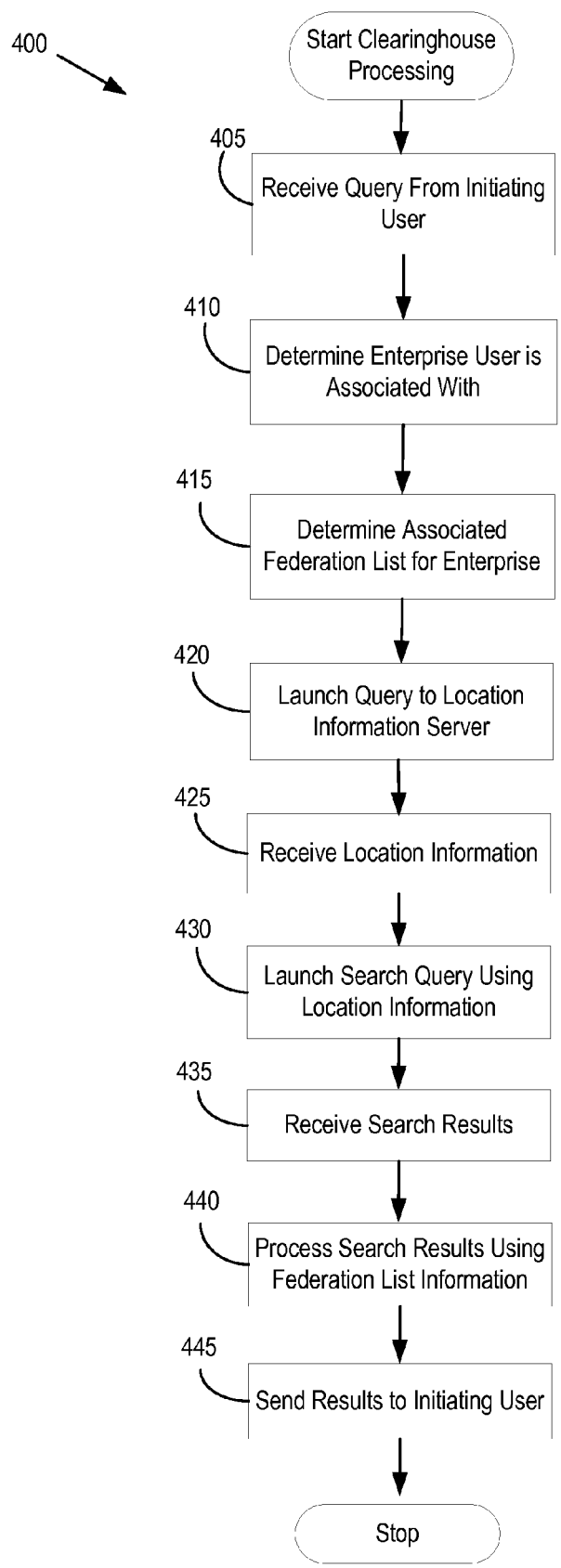
FIG. 4 illustrates a processing flow of the clearinghouse server according to one of the various embodiments disclosed herein.

An exemplary process flow that is performed by the clearinghouse server 112 is shown in FIG. 4. It should be appreciated that the logical operations described herein with respect to FIG. 4 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may he implemented in software, in firmware, in special purpose digital logic, and any combination thereof. It should also be appreciated that more or less operations may be performed than shown in the FIG. 4 and described herein. These operations may also be performed in a different order than those described herein.

In FIG. 4, the process begins in operation 405 with the clearinghouse server receiving a query from an initiating user. The clearinghouse server determines the enterprise the user is associated with in operation 410. The clearinghouse server uses this to ascertain any federated enterprises in operation 415.

In operation 420 the clearinghouse server uses the originating IP address or other user identification information to query the location information server 118 in operation 420. The location information server 118 returns location information as best that can be determined based on the information provided in the query operation 420. In some embodiments, the location information provided in response by the location information server 118 may be fairly detailed, e.g., a street address. In other embodiments, the location information may be relatively high level location information, e.g., city or town.

In operation 430, the clearinghouse server 112 initiates a search query in operation 430, which may utilize the received location information. Using the location information to augment the search query is not required in all embodiments. In some embodiments, the clearinghouse server initiates the search query simultaneously with the location query, and does not wait for the location information to be returned. However, if the clearinghouse server waits for the location information to be returned before initiating the search query, this allows the search query to he targeted based on the user's location. In this embodiment of FIG. 4, the search query includes the location information. In some embodiments, logic in the clearinghouse server 112 may decide whether to incorporate the location information into the search query based on the nature of the query.

The clearinghouse server receives the search results in operation 435, and processes the search results using the federated list information in operation 440. The list of federated enterprises can be identified by using the user's identification information to ascertain the user's enterprise. Once the enterprise is known, then the list of federated enterprises can be ascertained.

The processing of the results may involve ordering the results and providing additional communications related information about a search results. Once these results are processed in view of the list of federated enterprises, then the results can be sent to the user in operation 445.

Figure 5:
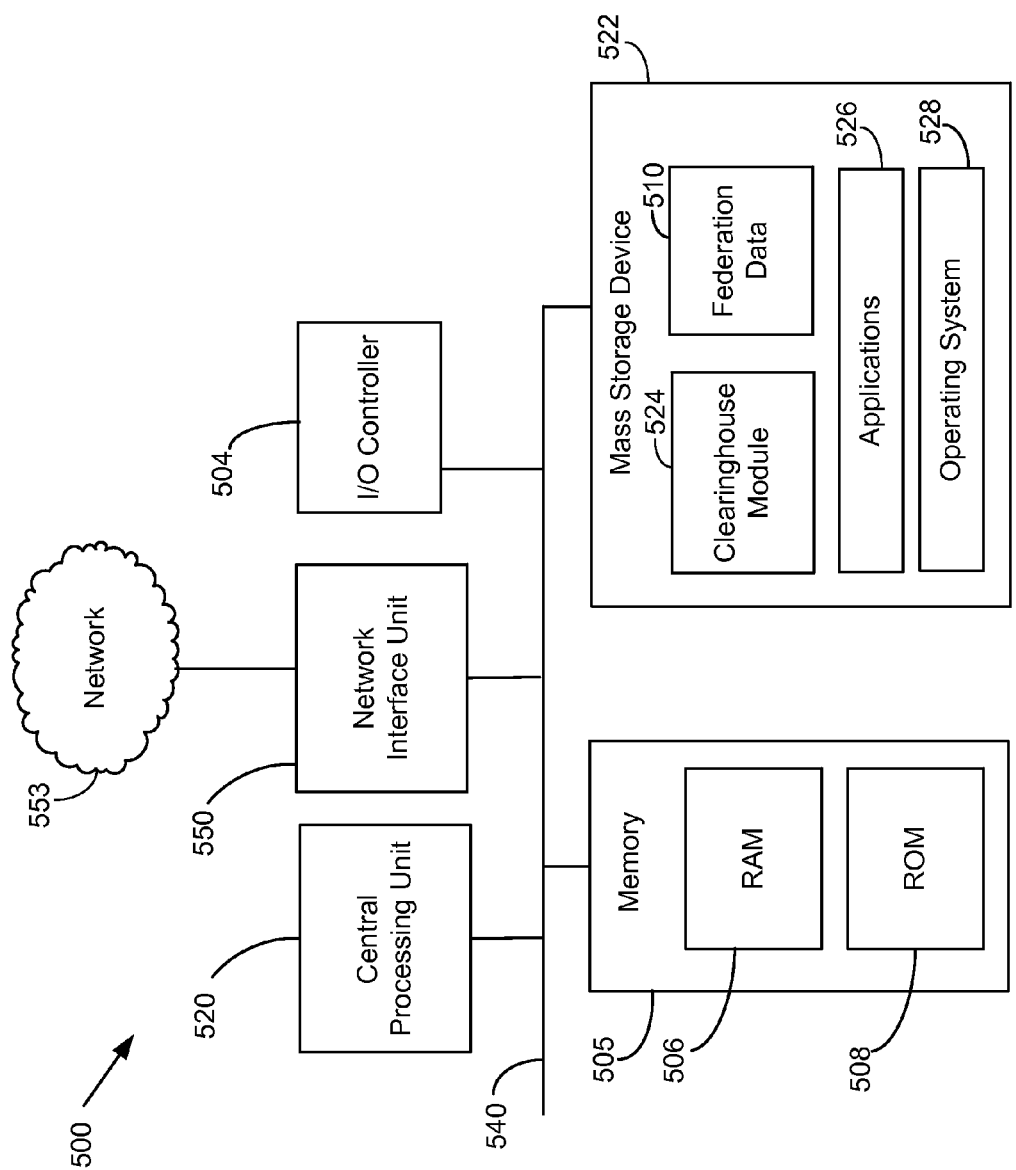
FIG. 5 is a hardware architecture for the clearinghouse server according to one of the various embodiments disclosed herein.

An embodiment of the computing architecture for the clearinghouse server for accomplishing the above operations is shown in FIG. 5. FIG. 5 shows an illustrative computing architecture for the clearinghouse server 112 capable of executing the software components described herein for processing queries from a user. The computer architecture shown in FIG. 5 illustrates a conventional computing device ("computer") 500 and may be utilized to execute any aspects of the software components presented herein. Other architectures or computers may be used to execute the software components presented herein.

The computer architecture shown in FIG. 5 includes a central processing unit 520 ("CPU"), a system memory 505, including a random access memory 506 ("RAM") and a read-only memory ("ROM") 508, and a system bus 540 that couples the memory to the CPU 520. A basic input/output system containing the basic routines that help to transfer information between elements within the clearinghouse server 500, such as during startup, is stored in the ROM 508. The computer 500 further includes a mass storage device 522 for storing an operating system 528, application programs, and other program modules, as described herein.

The mass storage device 522 is connected to the CPU 520 through a mass storage controller (not shown), which in turn is connected to the bus 540. The mass storage device 522 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers or servers through a network such as the network 553. The computer 500 may connect to the network 553 through a network interface unit 550 connected to the bus 540. It should be appreciated that the network interface unit 550 may also be utilized to connect to other types of networks and remote computer systems. The computer 500 may also include an input/output controller 504 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 522 and RAM 506 of the computer 500, including an operating system 528 suitable for controlling the operation of a networked desktop, laptop, or server computer. The mass storage device 522 and RAM 506 may also store one or more program modules or data files. In particular, the mass storage device 522 and the RAM 506 may store the clearing house module 524, and the federation data 510, described in detail above. The mass storage device 522 and the RAM 506 may also store other types of applications 523 and data.

It should be appreciated that the software components described herein may, when loaded into the CPU 520 and executed, transform the CPU 520 and the overall computer 500 from a general-purpose computing system into a special-purpose computing system customized to facilitate the functionality presented herein. The CPU 520 may be constructed from any number of transistors or other discrete circuit elements, which may individually or collectively assume any number of states. More specifically, the CPU 520 may operate as a finite-state machine, in response to executable instructions contained within the software modules disclosed herein. These computer-executable instructions may transform the CPU 520 by specifying how the CPU 520 transitions between states, thereby transforming the transistors or other discrete hardware elements constituting the CPU 520.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the computer 500 may comprise other types of computing devices, including hand-held computers, embedded computer systems, personal digital assistants, and other types of computing devices known to those skilled in the art. It is also contemplated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies are disclosed herein for processing queries from a communication user by using location information and federated enterprise information associated with the user. Although the subject matter presented herein has been described in language specific to computer structural fea-

The invention claimed is:

1. A computing device comprising:
a memory configured to store federated enterprise data, the federated enterprise data comprising data associating a first enterprise with a second enterprise that is federated with the first enterprise and information specifying communication capabilities that are available to the first enterprise and the second enterprise and are unavailable to non-federated enterprises, the communication capabilities comprising one or more of status indication, text-based communication, voice-based communication or video-based communication;
a network interface unit configured to receive a first query from a requesting computing device, wherein the first query comprises a user identifier; and
a processor configured to
initiate a second query to a location information server, wherein the second query comprises the user identifier,
receive location information associated with the user identifier from the location information server,
initiate a third query based on the first query to a search engine,
receive a first search query response from the search engine in response to the third query,
create a second search query response based on the first search query response and the federated enterprise data by including the information specifying the communication capabilities that are available to the first enterprise and the second enterprise and by listing a search result associated with the second enterprise prior to a search result associated with a non-federated enterprise, and
transmit the second search query response to the requesting computing device.

2. The computing device of claim 1 wherein the user identifier is a telephone number and the location information server provides a city associated with the user identifier.

3. The computing device of claim 1 wherein the search result associated with the second enterprise comprises contact information for initiating communication with an individual associated with the second enterprise.

4. The computing device of claim 3 wherein the contact information comprises information for initiating instant messaging.

5. The computing device of claim 1 wherein the network interface unit is configured to receive the first query conveyed in a session initiated protocol ("SIP") based message.

6. The computing device of claim 1 wherein the processor is configured to incorporate the location information in the third query.

7. The computing device of claim 1, wherein the text-based communication comprises instant messaging or email communication.

8. The computing device of claim 1, wherein the second search query is further created by filtering the first search query.

9. A method of processing search queries comprising:
receiving, at a first computing device, a query from a second computing device wherein the query comprises an originating address information of the second computing device and a user identifier;
initiating, at the first computing device, a second query to a location information server wherein the second query comprises the originating address information of the second computing device;
receiving location information of the second computing device from the location information server;
initiating, at the first computing device, a third query to a search engine, the third query comprising the location information and at least a portion of the query from the second computing device;
receiving, from the search engine, a response to the third query, the response comprising a plurality of search results;
determining an enterprise associated with the second computing device using the user identifier and identifying at least one federated enterprise affiliated with the identified enterprise, wherein communication capabilities that are unavailable to non-federated enterprises are made available to the enterprise associated with the second computing device and the at least one federated enterprise, the communication capabilities comprising one or more of status indication, text-based communication, voice-based communication or video-based communication;
processing the plurality of search results to produce a modified plurality of search results by adding information specifying the communication capabilities available to the identified enterprise and the at least one federated enterprise and by listing a search result associated with the at least one federated enterprise prior to a search result associated with a non-federated enterprise; and
transmitting the modified plurality of search results to the computing device.

10. The method of claim 9 wherein processing the plurality of search results further comprises ordering a subset of the plurality of search results to produce the modified plurality of search results.

11. The method of claim 9 further comprising determining communication related address information that is associated with the search result associated with the at least one federated enterprise.

12. The method of claim 11 wherein the communication related address information comprises instant messaging communication information.

13. The method of claim 12 wherein the communication related address information further comprises non-instant messaging communication information.

14. The method of claim 11 wherein the communication related address information includes a presence indication.

15. The method of claim 9, wherein processing the plurality of search results further comprises filtering the plurality of search results.

16. The method of claim 10 wherein receiving the query at the server from the computing device comprises receiving a SIP based message from a communications server.

17. An optical disk, a magnetic storage device, or a solid state storage device having computer-readable instructions stored thereupon which, when executed by a computer, cause the computer to:

receive, at the computer, a query comprising an originating address information of a computing device and a user identifier;

initiate a second query at the computer to a location information server wherein the second query comprising the originating address information of the computing device;

receive location information from the location information server;

generate, at the computer, a third query to a search engine, the third query comprising the location information and at least a portion of the query from the computing device;

receive a response to the third query from the search engine, the response comprising a plurality of search results;

identify at least one federated enterprise affiliated with an enterprise associated with the computing device using the user identifier, wherein communication capabilities that are unavailable to non-federated enterprises are provided to the at least one federated enterprise and the enterprise associated with the computing device, the communication capabilities comprising one or more of status indication, text-based communication, voice-based communication or video-based communication;

process the plurality of search results to produce a modified plurality of search results by using information defining the communication capabilities that are provided to the at least one federated enterprise and the enterprise associated with the computing device and by listing a search result associated with the at least one federated enterprise prior to a search result associated with a non-federated enterprise; and transmit the modified plurality of search results to the computing device.

18. The optical disk, the magnetic storage device, or the solid state storage device of claim 17 further comprising computer-readable instructions stored thereupon which, when executed by a computer, further cause the computer to:

determine a communication address for effecting communication with the at least one federated enterprise by retrieving the communication address from a data store indexed by the at least one federated enterprise; and include the communication address with the modified plurality of search results.

19. The optical disk, the magnetic storage device, or the solid state storage device of claim 18 further comprising computer-readable instructions stored thereupon which, when executed by a computer, further cause the computer to:

retrieve a thumbnail image associated with the first search result; and transmit the modified plurality of search results to the computing device comprising the thumbnail image.

20. The optical disk, the magnetic storage device, or the solid state storage device of claim 18 wherein the communication address is an instant messaging address.

* * * * *